US010366413B2

(12) United States Patent
Zhou et al.

(10) Patent No.: US 10,366,413 B2
(45) Date of Patent: Jul. 30, 2019

(54) SPONSORED ONLINE CONTENT MANAGEMENT USING QUERY CLUSTERS

(71) Applicant: Microsoft Technology Licensing, LLC, Redmond, WA (US)

(72) Inventors: Yunhong Zhou, Kirkland, WA (US); Christopher J Leggetter, Belmont, CA (US); Naiping Liu, Sunnyvale, CA (US); Daniel Delling, Mountain View, CA (US); Xiang Zhao, Beijing (CN); Xia Sharon Wan, Saratoga, CA (US); Andrew Goldberg, Emerald Hills, CA (US); Renato F. Werneck, San Francisco, CA (US); Darshan Vishwanath Kantak, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 641 days.

(21) Appl. No.: 13/926,670

(22) Filed: Jun. 25, 2013

(65) Prior Publication Data

US 2014/0379473 A1 Dec. 25, 2014

(51) Int. Cl.
*G06Q 30/00* (2012.01)
*G06Q 30/02* (2012.01)
(52) U.S. Cl.
CPC ..... *G06Q 30/0256* (2013.01); *G06Q 30/0244* (2013.01); *G06Q 30/0275* (2013.01)
(58) Field of Classification Search
CPC ...................................... G06Q 30/0207–0277
USPC ................... 705/705, 14.54, 14.1–14.73
See application file for complete search history.

(56) References Cited

U.S. PATENT DOCUMENTS

2006/0136320 A1   6/2006   Saberi et al.
2007/0061300 A1   3/2007   Ramer et al.
2007/0061335 A1   3/2007   Ramer et al.
(Continued)

FOREIGN PATENT DOCUMENTS

CN    101689199 A    3/2010
CN    102498498 A    6/2012

OTHER PUBLICATIONS

Analyzing Data From Sponsored Search Markets from an Agent-Based and Complex Systems Perspective, Valentin Robu, Han La Poutré, Sander Bohte, Proc. of 8th Int. Conf. on Autonomous Agents and Multiagent Systems (AAMAS 2009), Decker, Sichman, Sierra and Castelfranchi (eds.), May 10-15, 2009, Budapest, Hungary, pp. 1-8. ("Robu").*

(Continued)

*Primary Examiner* — Matthew T Sittner
*Assistant Examiner* — Allan J Woodworth, II

(57) ABSTRACT

Aspects of the subject disclosure are directed towards managing sponsored online content based upon advertiser behavior. Defining mini-markets to represent such advertiser behavior may be accomplished by clustering queries that generate revenue from one or more campaigns. Query revenue data between queries and a set of campaigns may be used to determine such mini-markets. To illustrate, a query whose highest revenue is attributed to a campaign may be selected for that campaign's mini-market. When that query is entered as a search term, the campaign's mini-market helps allocate space for advertisements.

19 Claims, 8 Drawing Sheets

(56) References Cited

U.S. PATENT DOCUMENTS

| | | | | |
|---|---|---|---|---|
| 2008/0010144 A1* | 1/2008 | Chatwin | ................ | G06Q 30/02 |
| | | | | 705/14.45 |
| 2010/0306210 A1* | 12/2010 | Wang | .................... | G06Q 30/02 |
| | | | | 707/759 |
| 2011/0184936 A1* | 7/2011 | Lymberopoulos | .......................... | |
| | | | | G06F 16/9574 |
| | | | | 707/721 |
| 2013/0085867 A1* | 4/2013 | Gao | .................. | G06Q 30/0241 |
| | | | | 705/14.71 |
| 2013/0238437 A1* | 9/2013 | Nair | .................. | G06Q 30/0242 |
| | | | | 705/14.54 |

OTHER PUBLICATIONS

Analyzing Data From Sponsored Search Markets from an Agent-Based and Complex Systems Perspective, Valentin Robu, Han La Poutré, Sander Bohte, Proc. of 8th Int. Conf. on Autonomous Agents and Multiagent Systems (AAMAS 2009), Decker, Sichman, Sierra and Castelfranchi (eds.), May 10-15 (Year: 2009).*

"International Search Report and Written Opinion Issued in PCT Application No. PCT/US2014/043512", dated Jan. 12, 2017, 7 Pages.

"Search Report Issued in European Patent Application No. 14740057.6", dated Nov. 8, 2017, 6 Pages.

"Office Action and Search Report Issued in Chinese Patent Application No. 201480036293.7", dated Mar. 5, 2019, 12 Pages.

* cited by examiner

SPONSORED ONLINE CONTENT MANAGEMENT USING QUERY CLUSTERS

BACKGROUND

In order to properly allocate online content for sponsorship when presented via an information portal, such as search engines, conventional portals auction each slot or position on such content to a highest ranking bidder (e.g., an advertiser or agent). Rank may be determined in terms of bidden dollar amount or by a weighted value computed from various factors, including a click-through rate or expected click percentage. Typically, a user submitting a query to a search engine invokes an auction for positions on the page returned by the query. Bidders offer to pay a price up to a specific amount for positions or slots; successful bids result in a search page displaying advertisements alongside ordinary search results for the query.

To illustrate one example, under a Generalized Second Price (GSP) auction, after an advertiser places a single bid, the bids are ranked by weight such that weighted bids determine the slot allocation. Most search engines typically take a two-pronged approach to the above auction: (1) find relevant advertisements for a query, and (2) estimate a click-through rate for the retrieved advertisements, apply an appropriate weight to each bid and allocate multiple slots for displaying those advertisements (one for each advertisement) on the search page. The slots are ordered and higher slots may be more valuable in terms of the click-through rate. For example, a top slot normally may receive twenty clicks per thousand impressions while a next-highest slot may receive ten clicks. Achieving an optimal assignment of slots has proven to a difficult and costly undertaking. This is especially true when taking into account the relatively short time frame within which the search page is typically displayed in response to the query.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards determining auction parameters for effective sponsored online content management. In one aspect, clustering queries based upon advertiser behavior produces data specific to an advertising campaign's intended market or mini-market. In one aspect, a mini-market generally characterizes an advertiser's bidding/spending strategy in terms of a utility/value realized by that advertiser. The mini-market data may be used to inform the advertiser of other queries on which to bid. Such data may be used to configure the above-mentioned auction parameters. In one aspect, some clustering approaches described herein consider semantic intent and/or advertiser intent by decomposing a query by each advertiser's behavior before determining advertisement price and/or allocation.

In one aspect, the above-mentioned auction parameters enhance sponsored search auctions. Instead of clustering queries as interchangeable commodities, queries within a same mini-market may be clustered together and assigned the same auction parameters to provide price stability and consistent advertiser spending/bidding behavior. In one aspect, queries are grouped together into a cluster based on co-clicked campaigns.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
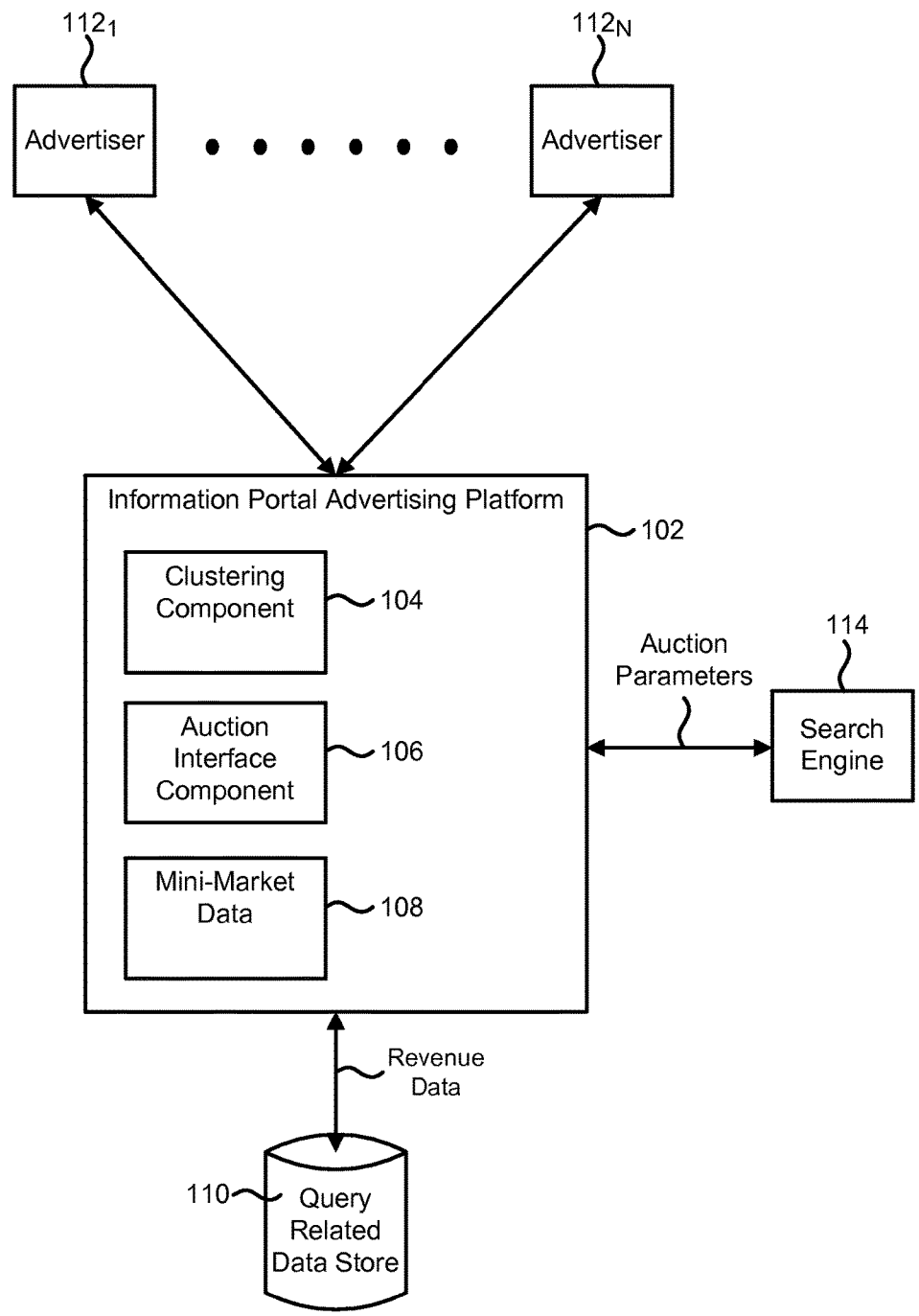
FIG. 1 is a block diagram illustrating an example system for sponsored online content enhancement according to one example implementation.

Various aspects of the technology described herein are generally directed towards sponsored online content auction management by clustering queries based upon advertiser behavior. Although the following description provides numerous example manifestations of such behavior, including advertiser spending and/or campaign revenue, the technology described herein is not limited to these examples and other forms of advertiser behavior can be used to cluster queries. Example embodiments in which advertiser behavior affects sponsored online content auctions include search engine advertising campaigns, for example, paid or sponsored searches. Paid or sponsored search auctions may be improved by selecting a set of auction parameters that maximizes an objective (e.g., an objective function, such as click yield or RPM (revenue per thousand queries) across incoming query traffic).

One example metric defines advertiser behavior in terms of mini-markets. A mini-market, generally, comprises a set of coherent, semantically related queries to which a set of advertisers target for sponsorship/advertising. As one example, one or more related (query) clusters may form a mini-market. By implementing a mini-market based approach to query clustering and auction configuration, advertiser behavior may stabilize and be more predictable. For one reason, the mini-market based approach clusters queries with similar advertiser targeting and intent and thus similar value, which allows each cluster's auction parameters to be incrementally adjusted toward an optimal set by leveraging the value estimates of each mini-market.

One example implementation clusters queries according to co-clicked campaigns, such as when two or more queries derive clicks from a same campaign. For at least this reason, these queries can be considered somewhat related. One or more clusters may be further combined into mini-markets comprising queries associated with a group of related advertisers, such as those who share intent. The clustering implementation described above may be combined with other clusters in a hybrid clustering approach. As one example, other queries not in any cluster still can be grouped into clusters based on vertical labels (e.g., concept-hierarchy labels), rank/score distance and/or other data.

Another example implementation performs co-spend/co-bidding graph partitioning, for instance, by generating an advertiser/campaign-query spending and bidding graph and using related modularity maximization techniques to define clusters. Measuring modularity generally involves executing a quality function over a set of possible partitions of a graph, such as a tree or a network structure. Each implementation for measuring modularity attempts to quantify how close these partitions are to a statistically specific arrangement of edges/connections, which may be known as a community. In addition, the above approach enables incremental mini-market refinement and tree structure stability. Examples of incrementally updating the clusters include expanding existing mini-markets with new advertisers, adding a new query to the clusters, modifying the clusters in response to changing advertiser bidding/spending behavior and/or the like.

The technology described herein applies a mini-market based approach to clustering queries and configuring auction parameters, including parameters for establishing minimum or near-minimal costs (e.g., reserve prices) and allocation decisions (e.g., slots/positions for placing advertisements). Other auction parameters that may be optimized include score smoothing (squashing) factors, hard/soft filters, such as relevance constraints, and/or the like.

One example implementation exposes an application programming interface (API) to provide each advertiser with access to the auction parameters for each query cluster. Via the API, the advertiser may access various statistics, bid/price information and/or other data for individual mini-markets. In view of such data, the advertiser may use the API to modify current advertising campaigns and/or bidding strategies.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and online content management in general.

FIG. 1 is a block diagram illustrating an example system for sponsored online content management according to one example implementation. The example system includes an advertising platform 102 for an information portal that processes query related information, including revenue data, and produces data indicating improvements to online auctions and sponsored online content. Examples of such online content may include Internet search results (e.g., a search page), social networking activity/update feeds and/or the like.

Example components of the advertising platform 102 may include a clustering component 104 and an auction component 106. One example implementation of the clustering component 104 generates mini-market data 108 using data retrieved from the query related data store 110. The mini-market data 108 may describe a set of clusters by enumerating each query within each cluster. The clustering component 104 may group queries related by advertiser behavior into a same cluster using any of the clustering approaches described herein, for example, or other clustering mechanisms.

It is appreciated that the clusters can be implemented in a number of structures. A first example structure includes a bi-partite graph in which each cluster is defined by a graph cut. A second example structure includes a network or a tree of nodes in which each cluster comprises a group of nodes and each node represents a query or advertiser/campaign/category.

The second example structure maintains a division between groups resulting in dense connections between nodes within a same group and sparse connections between groups. This property may be referred to a community structure, and accordingly each group of the second example structure may be referred to as a community. A relevant quality measure for a particular division may be referred to as modularity (e.g., global modularity). Modularity, up to a multiplicative constant, may represent a number of edges falling within communities minus an expected number in an equivalent network or tree structure with edges placed at random.

To illustrate one example technique for maximizing modularity measure Q while clustering queries into c communities, consider a network of queries with n nodes and m links (edges) that can be partitioned into c communities. Let A represent an adjacency matrix for the network such that $A_{ij}=0$ means there's no edge (no interaction) between nodes in community i and nodes in community j and $A_{ij}=1$ means there is an edge between the two communities. By randomly selecting nodes with node degrees $k_i$ and $k_j$ from communities i and j, maximizing the modularity measure Q for this network involves the following equation:

$$Q = \sum_{ij} \left[\frac{A_{ij}}{2m} - \frac{k_i * k_j}{(2m)(2m)}\right]\delta(c_i, c_j) = \sum_{i=1}^{c} (e_{ii} - a_i^2)$$

In the above equation, $e_{ii}$ is the fraction of edges with both end vertices in the same community i and $a_i$ is the fraction of edges with at least one end vertex in community i. Using this approach, the clustering component 104 may initially partition queries into separate community. At each iteration, the clustering component finds two communities having an amalgamation providing a greatest increase in modularity. Communities are combined until no further improvement in modularity is possible.

One example implementation of the auction component 106 uses the mini-market data 108 to generate a set of parameters for operating an auction between a set of advertisers 112, which are illustrated in FIG. 1 as an advertiser $112_1$ . . . an advertiser $112_N$. The set of advertisers 112 initiate a set of campaigns (e.g., advertising campaigns) that involve sponsoring online content provided by a search engine 114. The advertising platform 102 feeds various data regarding the set of campaigns to the search engine 114.

According to one example implementation, the auction component 106 determines auction parameters for configuring and/or running a sponsored search auction for search page slots. A set of auction parameters may correspond to a specific query or cluster. These parameters may include, but not limited to, allocation decisions/thresholds, score smoothing factors, costs such as mainline reserve costs, hard/soft filters such as relevance constraints. By way of example, an allocation decision may involve determining whether to place an advertisement on a mainline or a sidebar.

For each query submitted through the search engine 114, the auction component 106 matches that query to a set of ranked advertisements. The search engine 114 ranks these advertisements according to these auction parameters and the mini-market data 108. The search engine 114 allocates space on the resulting search page for displaying these advertisements. Some advertisements may be placed at different positions than other advertisements for a variety of reasons of which some example reasons are revenue related. For instance, because a first advertisement generated more clicks—and hence more revenue—for a particular query than a second advertisement, the search engine 114 places the first advertisement at a more prominent position on the resulting search page.

Each advertiser involved in sponsoring online content through an (advertising) campaign effectively "bids" for a position on the resulting search page based upon a set of factors, such as a mainline reserve threshold and/or an expected click-through rate weight. The above factors and/or other factors may be combined into a function configured to determine an example advertisement's score, potential search page position and/or cost. There are a number of applicable metrics for computing the example advertisement's score, including a utility score/rank.

The mainline reserve threshold refers to a minimum query-advertisement pair score for placement on a prominent portion of the resulting search page, which may be known as the mainline. For instance, the mainline may refer to a series of positions on top of or to a right or a left of a set of organic search results. A first position may be the most prominent and therefore allocated to an advertisement providing the most revenue given the auction parameters. A last position on the mainline may be assigned a reserve price computed from the mainline reserve threshold to ensure a minimum amount of revenue. If the example advertisement's bid does not satisfy the mainline reserve threshold, the auction component 106 still may display the example advertisement on another part of the resulting search page, such as the sidebar. The expected click-through rate weight refers to a bid's rank, when compared to other competing advertisements, which is derived from the revenue generated from displaying the example advertisement.

After the clustering component 104 groups the queries into clusters, the auction component 106 establishes an optimal set of auction parameters for each individual cluster. Because the queries that comprise a cluster may have a same or similar value and/or advertiser intent, the auction component 106 may set a per-click price or allocate a position on a search page that maximizes revenue associated with at least some of the queries. As one example, even when a first advertiser offers more money per click than a second advertiser who generates more revenue and/or covers more clicks for a query, the auction component 106 places an advertisement from the second advertiser in a higher position than an advertisement from the first advertiser. In some instances, revenue generated from the second advertiser's advertisement increases because of higher click-through rates attributable to the more prominent position.

One example implementation of the auction component 106 exposes an interface to the set of advertisers 112 to enable mini-market data sharing and query cluster customization. The auction component 106 uses the optimal set of auction parameters to configure an auction of query between the set of advertisers 112. The auction component 106 may accept bids for different keywords in which each bid represents an advertiser's commitment to pay for placement to a most prominent position possible given the advertising campaign's expected click-through rate for a particular combination of keywords and/or the advertising campaign's proposed pay-per-click value for that same combination. Other factors may play a role in determining whether or not to select a certain bid, including but not limited to utility rank, relevance and/or the like.

For a particular advertiser, the auction component 106 examines the mini-market data 108 and identifies one or more queries likely to result in that advertiser spending money (e.g., a price-per-click) according to one example implementation. Via an API exposed by the auction component 106, the particular advertiser is presented with data describing each identified query. For one example query, the advertiser provides a bid indicating a pay-per-click amount that achieves a desired click coverage (e.g., a maximal click coverage).

Figure 2:
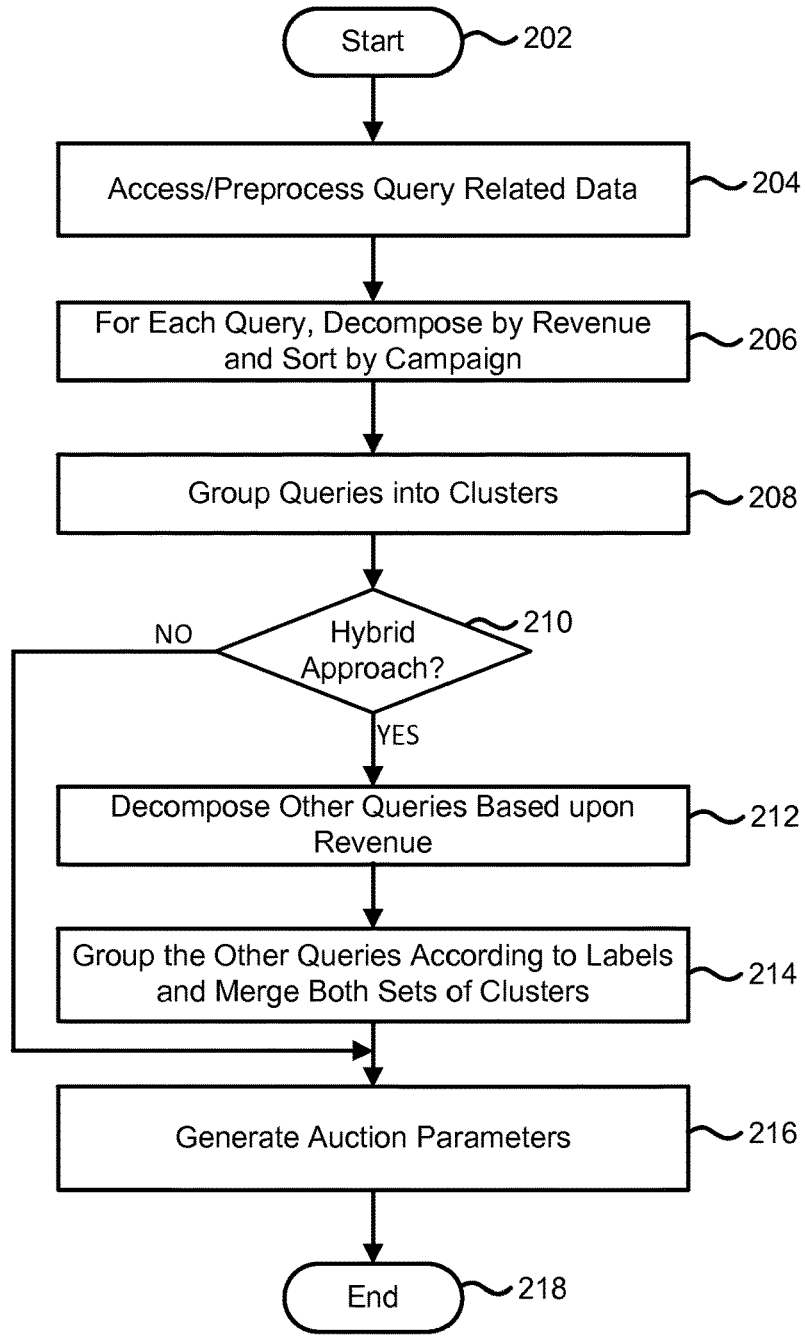
FIG. 2 is a flow diagram illustrating example steps for clustering queries based upon revenue data according to one example implementation.

FIG. 2 is a flow diagram illustrating example steps for clustering queries based upon revenue data according to one example implementation. One or more hardware/software components (e.g., a clustering component 104 of FIG. 1) of an information portal advertising platform may be configured to perform the example steps. Step 202 commences the example steps and proceeds to step 204 where query related data is accessed and pre-processed prior to clustering. The query related data may include billable click data over a period of time (e.g. one month) in which the billable click data provides <query, campaign, vertical> information. One example implementation also includes a bipartite graph connecting queries to a set of advertising campaigns. Each of these connections may be weighted according to revenue generated through, for example, advertiser/campaign bidding on keywords, advertiser/campaign spending on main line impressions and/or user clicks and so forth. As one alternative, these connections may be weighted based upon the advertiser's bidding strategy.

During pre-processing, step 204 eliminates certain queries in order to limit a size of the bipartite graph. One example implementation of the advertising platform removes brand term queries and/or queries with insufficient expected click percentages. One example approach is based on clustering queries over the query-campaign bipartite spending graph. Step 206 proceeds to decompose and sort each query's revenue by campaign. Step 208 executes operations for grouping into clusters queries whose highest revenue can be attributed to a particular campaign. Step 208 may discard clusters with insufficient revenue and/or click-through rates. Alternatively, step 208 may retain leftover queries from these clusters, such as for a hybrid approach that involves clustering these queries by cutting a query-vertical label bipartite spending graph.

Step 210 determines whether to invoke the hybrid approach in addition to clustering queries according to the campaign with a highest revenue generated. As described herein, the mini-market based clustering approach may be extended with other clusters in a hybrid approach. Examples of other clusters include those queries grouped according to vertical label, a historic rank score or a web result-query co-click. The vertical label may be conditioned upon a spending threshold such that the query may be reclassified to a different label assuming that the spending threshold remains satisfied. If others queries are to be grouped into additional clusters, step 210 proceeds to step 212. Step 212 decomposes the other queries based upon another factor, such as revenue. Step 214 uses vertical labels to group the other queries into clusters and then, merges both sets of clusters. As described herein, the vertical labels may refer to concept hierarchy classifications. The vertical labels may be customized per user. If there are no more queries to be clustered, step 210 skips step 212 to step 214 and proceeds directly to step 216.

Step 216 generates auction parameters for resolving sponsored online content auctions. A generalized second revenue auction, for instance, uses these parameters to determine advertisement allocation and/or price. These parameters may be generated based on some optimization criteria, such as revenue maximization, click yield and/or the like. Some or all queries in a same cluster may be assigned identical auction parameters. One example auction parameter includes a mainline score/rank reserve threshold, which refers to a minimum score/rank for allocating space for an advertisement on the resulting search page's mainline (e.g., an area defining a top of the search page). If the resulting search page includes an alternative area for placing advertisements, such as a sidebar, a minimum score/rank of that alternative area may be established as another example auction parameter.

Another example auction parameter includes a squashing factor. In one example implementation, a weight is applied to each bid that is computed from one or more factors, including ad-specific effects such as an advertisement's past or an expected click-through rate. This weight may be herein referred to as an expected click-through rate weight or click weight. Some implementations employ position-specific effects in which a specific position's expected click-through rate is factored into the bid's weight. The expected click weight is further adjusted based on the squashing factor, which serves as an exponent to that weight. For example, if the squashing factor is 1.5, then the bid weight becomes the expected click-through rate to the power of 1.5. The squashing factor parameter and the mainline reserve threshold parameters discussed above may be combined in a number of ways to set additional parameters. One example parameter includes a reserve price representing a minimum price-per-click to an advertiser, which can be computed as a quotient of the mainline reserve threshold and the bid's weight. If an advertiser bids less than the reserve price, the advertisement is not shown on the mainline. Another example parameter comprises an actual price-per-click, which may be computed as a produce between the bid and a ratio between a lower bid's score/rank (weighted bid) and the current score/rank (weighted bid). That ratio may represent another auction parameter known as a squashing factor. These auction parameter ensure that an advertiser is charged the lowest bid that advertiser could have placed while maintaining a present position. To maintain that position, the advertiser may submit a bid satisfying certain constraints—one of which ensures that an advertisement's weighted bid is greater than or equal to a next highest bidding advertisement's weighted bid. It is appreciated that the sponsored online content auction may employ additional parameters and those parameters are envisioned by the present disclosure. Step 218 terminates the example steps depicted in FIG. 2.

Figure 3:
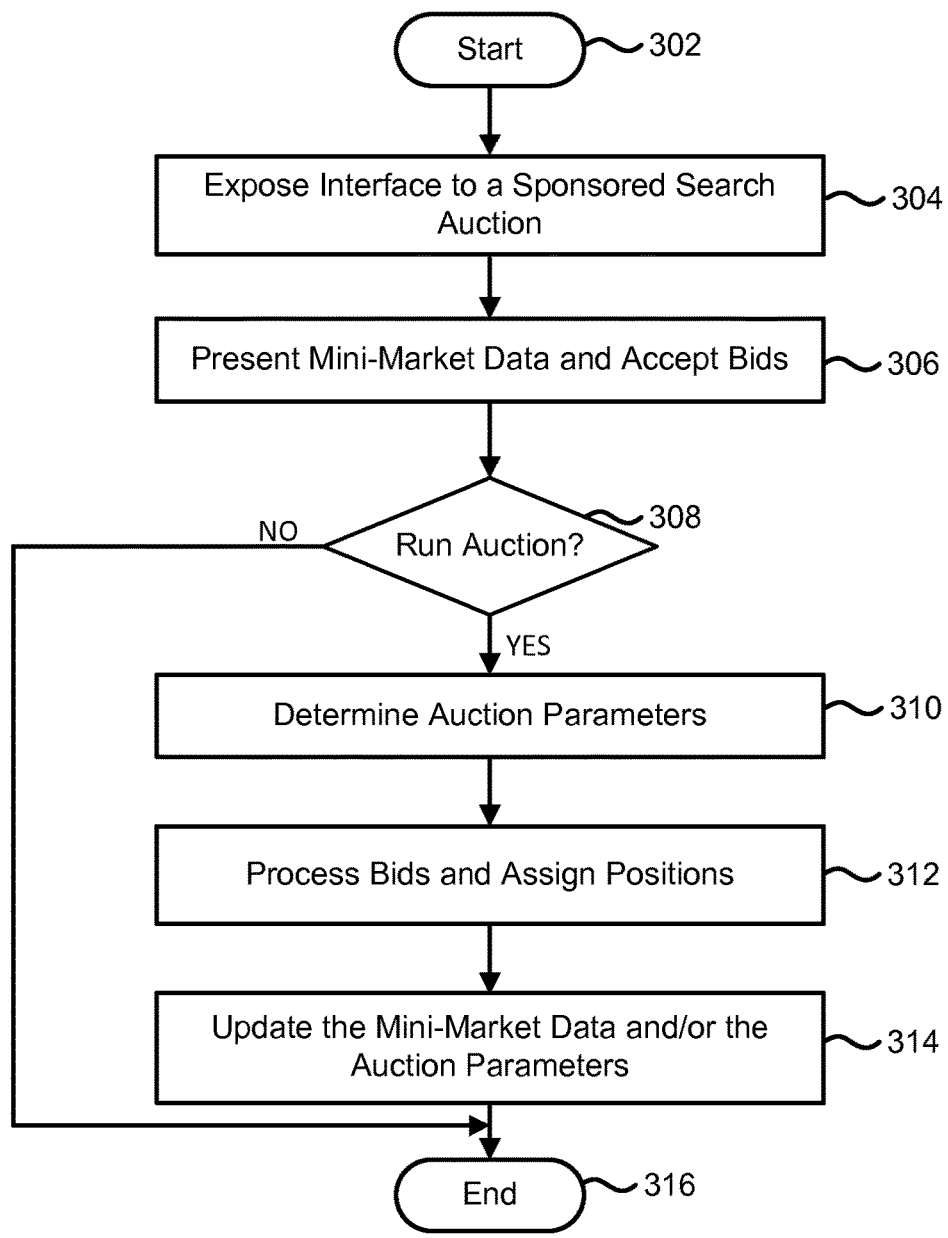
FIG. 3 is a flow diagram illustrating example steps for providing a set of advertisers with an interface to a sponsored search auction according to one example implementation.

FIG. 3 is a flow diagram illustrating example steps for providing a set of advertisers with an interface to a sponsored search auction according to one example implementation. One or more hardware/software components (e.g., the auction component 106 of FIG. 1) may be configured to perform the example steps. Step 302 commences the example steps and proceeds to step 304 where an interface to the sponsored search auction is exposed. As described herein, an advertising platform is configured to operate auctions for sponsoring online content, such as Internet searches. One example implementation configures a generalized second-price auction mechanism using query cluster-derived auction parameters, but it is appreciated that other auction models are envisioned by the present disclosure.

Step 306 presents mini-market data to a set of advertisers and accepts bids on keywords and/or keyword combinations (e.g., queries). According to one example implementation, each bid represents a maximum price-per-click a particular advertiser is willing to pay. Bids may represent alternative values, such as a maximum price the particular advertiser is willing to pay per mainline impression.

The mini-market data enumerates each cluster's composition such that each advertiser can identify which queries contribute their highest revenue to the advertiser's campaigns. Based upon such information, the advertiser may adjust the bid amount because of a realized increase to the advertisement's intrinsic value. For each query in a cluster, the auction component may pre-select search page positions for one or more advertisements, including those advertisements related to the cluster's campaign. The pre-selected positions may optimize certain objectives, such as revenue and/or click coverage. Of course, the pre-selected positions may be altered when the auction is actually run. During step 306, the advertising platform may modify the mini-market data and/or the auction parameters based upon the pre-selected positions and other data. For example, an advertiser may change a bid affecting a corresponding cluster's composition.

Step 308 determines whether to run an auction for space on a search page resulting from a query being entered into a search engine. The auction component may provide an offline version of the mini-market data to a search engine, which in response to a query, initiates the auction for search page positions. The auction component, as one alternative mechanism, may run the auction using an online version of the mini-market data on behalf of the search engine. If step 308 decides not to run the auction, step 308 omits step 310 and directly proceeds to step 316.

If step 308 decides to run to the auction, step 308 proceeds to step 310 where auction parameters are determined. As described herein, the auction parameters for each advertisement may include a mainline reserve threshold, a squashing factor (applying to the estimated click-through rate to get the click weight), and/or the like. These weights may be applied when ranking bids in order to allocate an appropriate search page position for an advertisement. Other auction parameters may include allocation decisions, hard/soft filters, such as relevance constraints and so forth. By way of example, an allocation decision may involve determining whether to place an advertisement on a mainline or a sidebar. The smoothing factor may be used to modify an expected click weight and control an advertisement's price-per-click. The relevance constraints comprise a threshold relevance score in order to identify and remove irrelevant advertisements from consideration. Step 312 processes the bids and assigns search page positions to these bids. Step 312 may predict an optimal assignment of such positions in an attempt to maximize an objective (e.g., revenue).

Step 314 incrementally updates the mini-market data and/or the auction parameters based upon the search page position assignment and other data. For example, the auction component modifies a minimum reserve price-per-click by increasing a mainline reserve threshold in order to obtain more revenue for the search engine and retain more valuable slots for a particular mini-market of advertisers. The threshold adjustment also may prevent unrelated advertisements from being allocated any of the mainline slots. Step 316 terminates the example steps depicted in FIG. 3.

Figure 4:
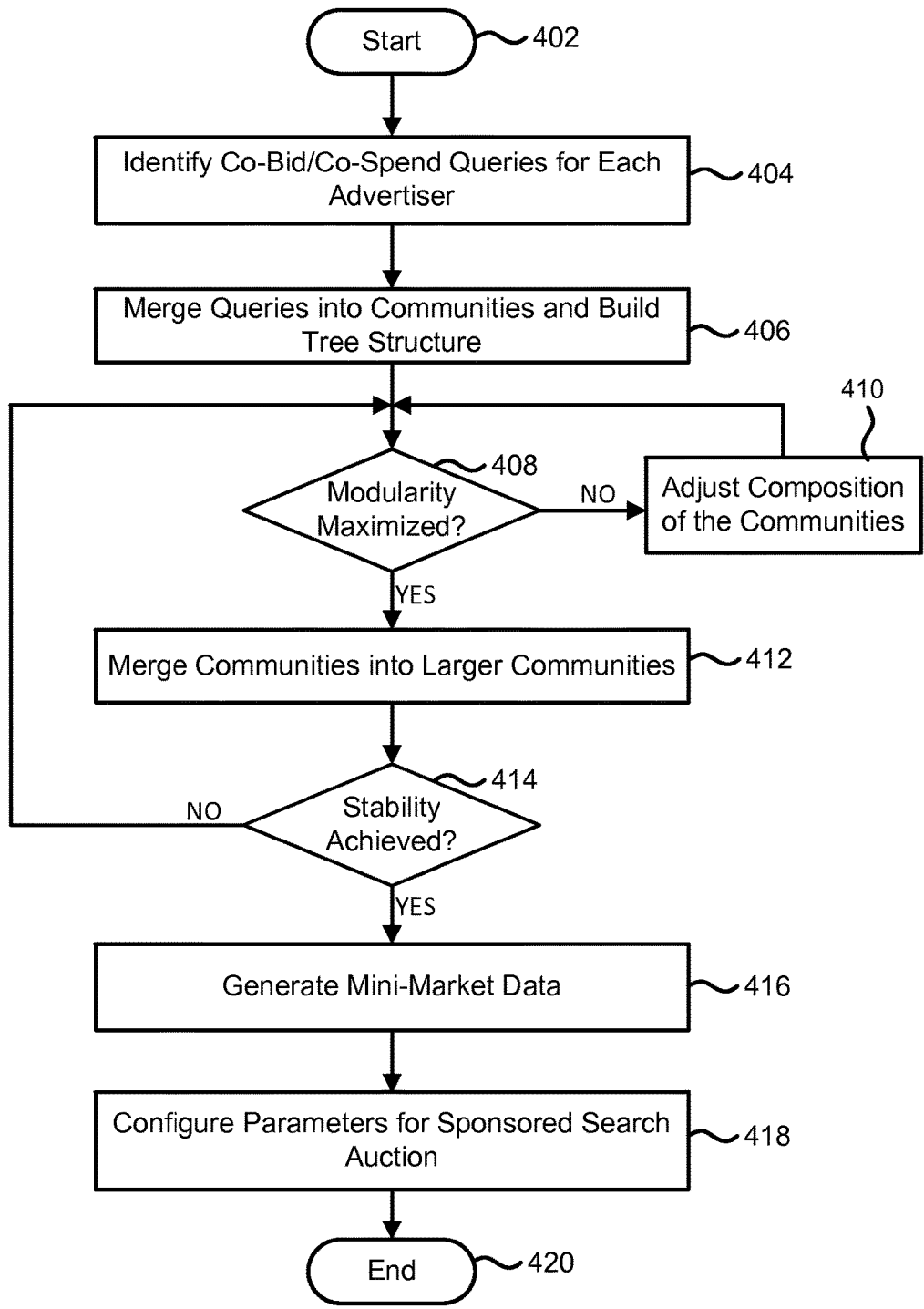
FIG. 4 is a flow diagram illustrating example steps for a modularity approach to clustering queries according to one example implementation.

FIG. 4 is a flow diagram illustrating example steps for a modularity approach to clustering queries according to one example implementation. One or more hardware/software components (e.g., a clustering component 104 of FIG. 1) may be configured to perform the example steps. Step 402 commences the example steps and proceeds to step 404 where co-bid/co-spend queries are identified for each advertiser/campaign.

Step 406 merges queries into communities and builds a layer of a tree structure. Step 406 may be adding a new layer to a partially built tree structure or building an initial layer on an empty tree structure. Each community represents one example query cluster structure. When completed, the tree structure comprises one or more layers of communities in order of density such that a topmost layer comprises the largest communities. As described herein, a clustering component may partition an advertiser-spending graph in a manner that increases modularity. Step 408 determines whether the tree structure's modularity is maximized. If the tree structure has not achieved maximum modularity, step 408 proceeds to step 410. Step 410 adjusts the composition of the communities to increase modularity. As one example, step 410 moves queries from one community to another community. Step 410 returns to step 408 to determine whether the modularity has been maximized. Step 410 is repeated until maximum modularity is achieved. Ensuring maximum modularity in the tree structure enables generation of effective parameters for resolving sponsored search auctions.

Once step 408 confirms modularity maximization within the tree structure, step 408 proceeds to step 412 at which some communities are merged into larger communities forming a new layer for the tree structure. Step 414 evaluates the tree structure and determines whether that tree structure is stable. By way of example, top layer communities of a stable tree structure may be characterized by at least the following property: a division of nodes within which the network connections are dense but between which network connections are sparser. Such a tree structure requires no further training on query related data. Furthermore, the stable tree structure may be used in embodiments where the auction component incrementally updates the division of nodes in response to changes in advertiser spending/bidding strategy. There may be a correlation between stability and a number of layers; hence, the tree structure's stability may be measured according to the tree structure's height according to one alternative.

Step 416 uses the tree structure to generate mini-market data describing each community on a top (densest) layer as an individual mini-market. As described herein, each mini-market represents a set of queries related to a set of advertisers based upon advertiser behavior. Step 418 configures parameters for running a sponsored search auction. With respect to offline embodiments, the auction component executes a substantial number of simulated auctions over the mini-market data and a set of queries. Given certain constraints, each simulation attempts to select a mainline reserve threshold, a squashing factor for click weight adjustment and/or other parameters that maximize a particular objective, such as total revenue per thousand impressions or a number of clicks. Example constraints may include lower bounds for a click yield or a mainline click yield and an upper bound for a mainline impressions yield. When an optimal set of auction parameters is identified, the auction component provides these parameters to search engines running the sponsored search auctions.

With respect to online embodiments, a search engine uses these parameters and operates the sponsored search auction. The mini-market data, being subject to constant change, may be updated in iterations at the request of the search engine. Accordingly, in response to a change in advertiser spending/bidding behavior, the tree structure is either rebuilt from scratch or from a partially built tree. The sponsored search auction parameters also are updated to reflect the rebuilt tree structure. Step 420 terminates the example steps depicted in FIG. 4.

Figure 5:
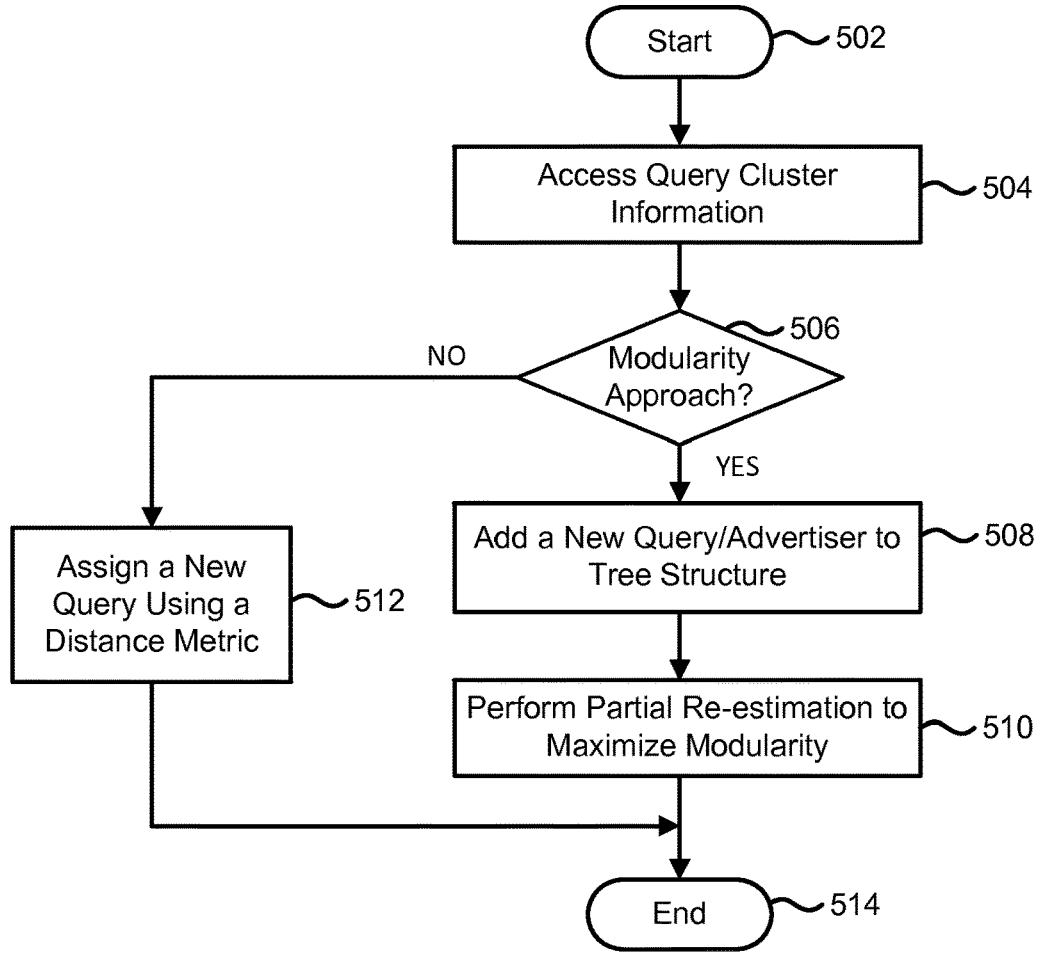
FIG. 5 is a flow diagram illustrating example steps for updating mini-market data according to one example implementation.

FIG. 5 is a flow diagram illustrating example steps for updating mini-market data according to one example implementation. One or more hardware/software components (e.g., an auction component 106 of FIG. 1) may be configured to perform the example steps. Step 502 commences the example steps and proceeds to step 504 where mini-market data is accessed. Step 506 determines whether to engage in a modularity approach to clustering queries.

Step 508 adds a new query or a new advertiser to a tree structure representing a grouping of communities having sufficient modularity. Each community may be a structure for representing a mini-market, which as described herein may comprise a set of related queries for a set of advertisers. Step 510 performs partial re-estimation to maximize modularity within the tree structure. If a modularity approach is not employed, step 506 proceeds to step 512 where a new query is assigned to a cluster using a distance metric. Example distance metrics include semantic similarity as estimated by a related model, advertiser co-bidding and/or the like. If the distance metric employs a semantic similarity model, the query may be grouped into the cluster that comprises a highest number of semantically similar queries. Step 514 terminates the example steps depicted in FIG. 5.

Figure 6:
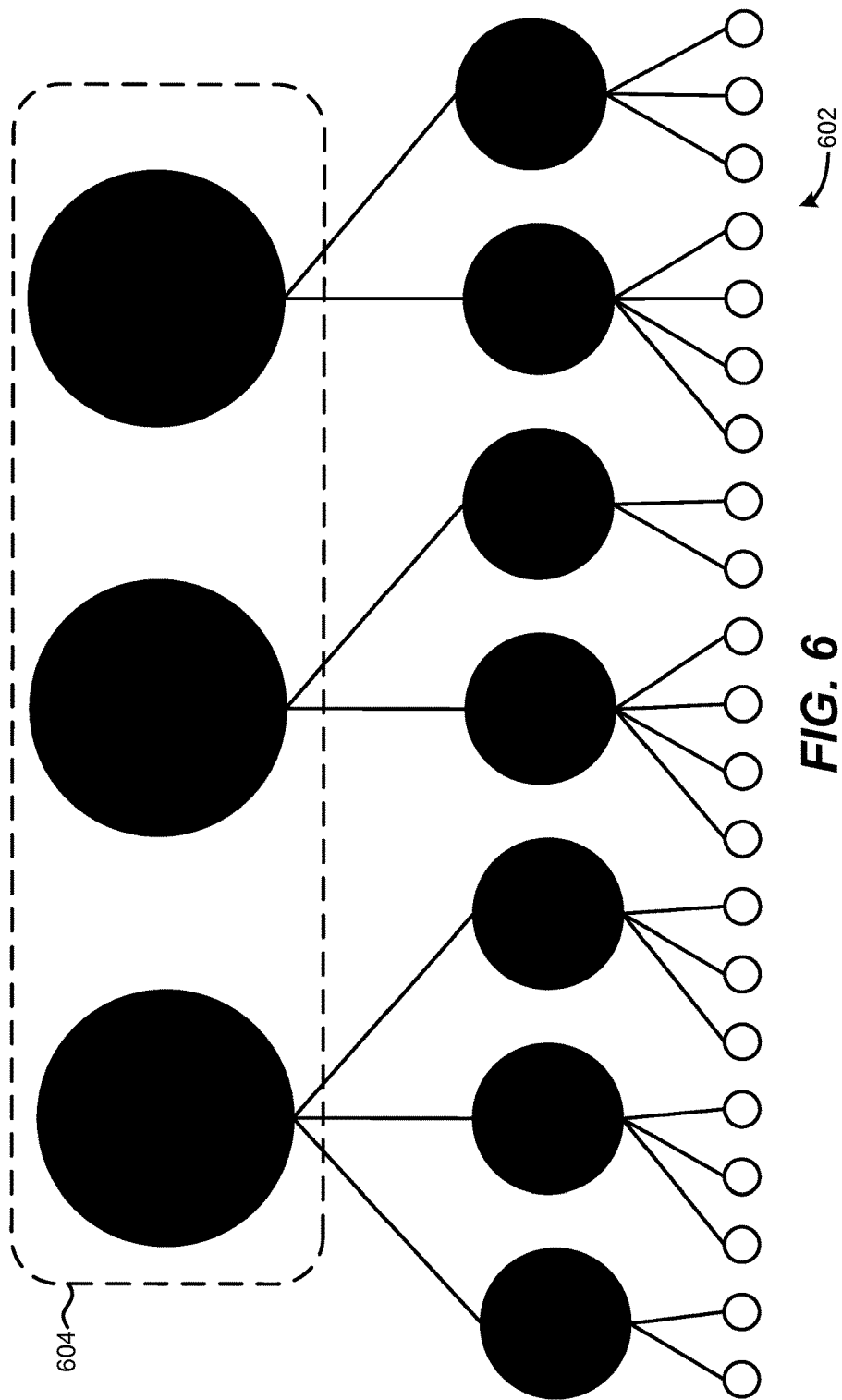
FIG. 6 illustrates an example structure configured to maintain mini-market data according to one example implementation.

FIG. 6 illustrates an example structure configured to maintain mini-market data according to one example implementation. The example structure may be referred to as a tree structure 602 in which communities of queries are formed layer-by-layer. A community, as described herein, refers to an example embodiment of a query cluster. Each unfilled white circle represents a query occupying an initial or lowest layer of the tree structure 602. As depicted in FIG. 6, the tree structure 602 also includes a middle layer comprising the above mentioned communities and a top layer 604 comprising even denser communities.

Based upon an advertiser bidding and spending graph in which each connection denotes at least some revenue derived from a bid between a query and an advertiser, two or more queries having comparable advertiser spending behavior are merged into a next layer of communities represented in FIG. 6 as black circles. Each connection is weighted by a utility/value in a perspective of the advertiser. For example, if a particular advertiser bid and spent money on two queries, those two queries may be merged into a community. If another advertiser bid and spent money on the same two queries, the advertiser may be merged into the community because both the queries and the advertisers are most likely related by intent.

Each merger brings the tree structure 602 closer to maximum global modularity. Queries and/or advertisers may be moved in and out of communities if such maneuvers possible yield an increase in modularity. Once maximum modularity is achieved, a new layer—the top layer 604—is built over the middle layer as illustrated in FIG. 6. The top layer 604 includes three (3) communities representing mini-markets of one or more advertisers and queries that share spending/bidding behavior. After performing modularity maximization on the top layer 604, the tree structure 602 may be sufficient stabile for deployment to a search engine where the tree structure 602 may facilitate sponsored search auctions.

To illustrate by way of example, modularity for the tree structure 602 can be expressed in terms of eigenvectors of a characteristic matrix—a modularity matrix. The following describes one example implementation of using this matrix to perform community detection via modularity maximization. After constructing the modularity matrix, and finding a leading (e.g., most positive) eigenvalue and corresponding eigenvector, the tree structure is divided into two partitions according to the signs of the elements of the eigenvector. This process is repeated for each of the partitions using a generalized modularity matrix. If a proposed division makes a zero or negative contribution to a total modularity, a corresponding sub-graph undivided. When the entire tree structure has been decomposed into indivisible sub-graphs, maximum modularity is achieved and each partition represents a community. According, each community is, by definition, an indivisible sub-graph.

The tree structure 602 may be updated in response to advertiser spending/bidding behavior changes. For example, after a set of advertisers increase bidding on two or more queries, modularity of the tree structure 602 may no longer be maximized. Accordingly, the communities at the top layer 604 may no longer be as dense. The tree structure 602, therefore, is deconstructed such that the top layer 604 can be rebuilt to achieve maximum modularity. Other example changes include the addition of new queries and/or new advertisers/campaigns.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
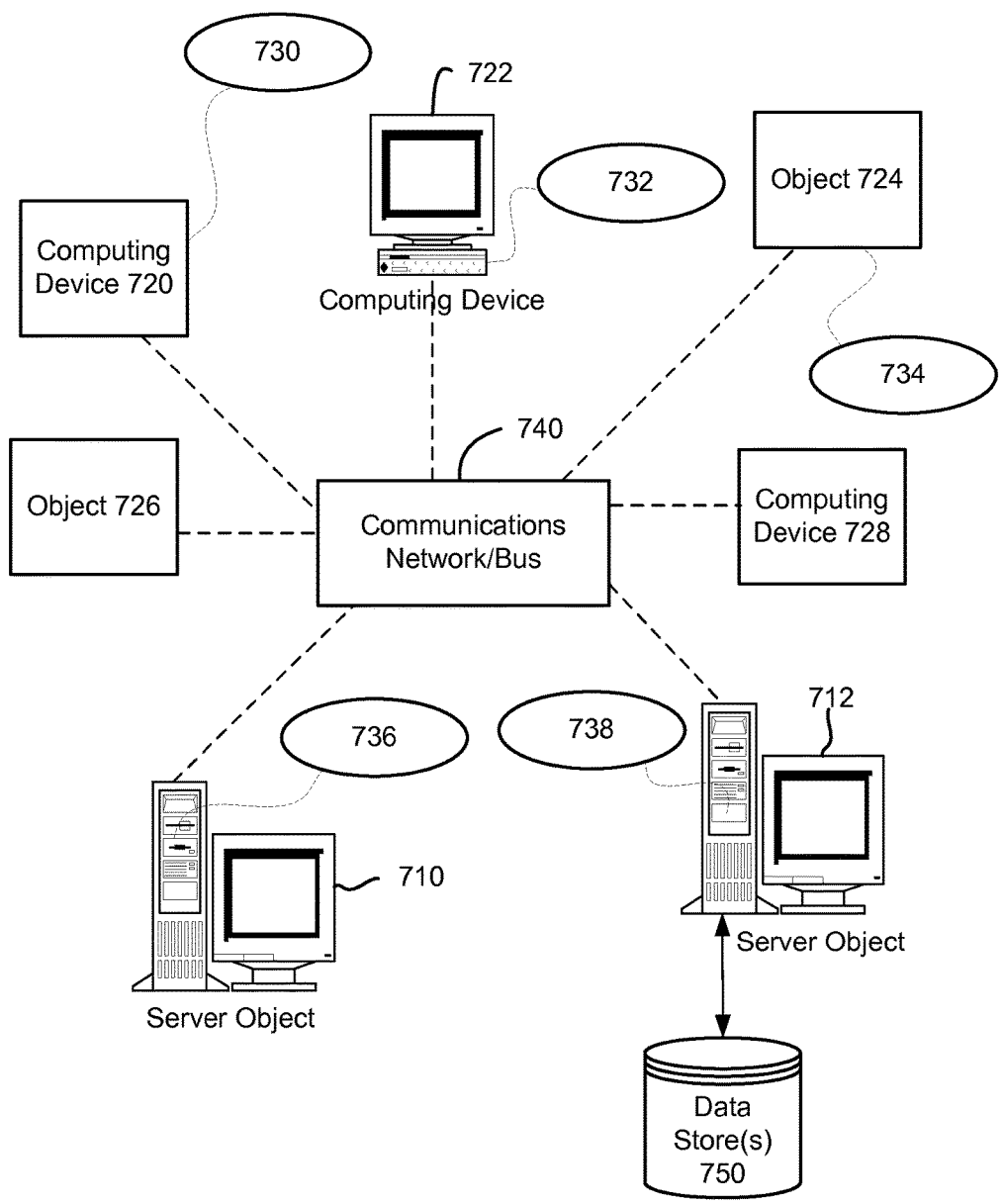
FIG. 7 is a block diagram representing example non-limiting networked environments in which various embodiments described herein can be implemented.

FIG. 7 provides a schematic diagram of an example networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances. Computing object 712, for example, acting as a server provides computing objects or devices 720, 722, 724, 726, 728, etc. with access to storage resources within the data store(s) 750.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
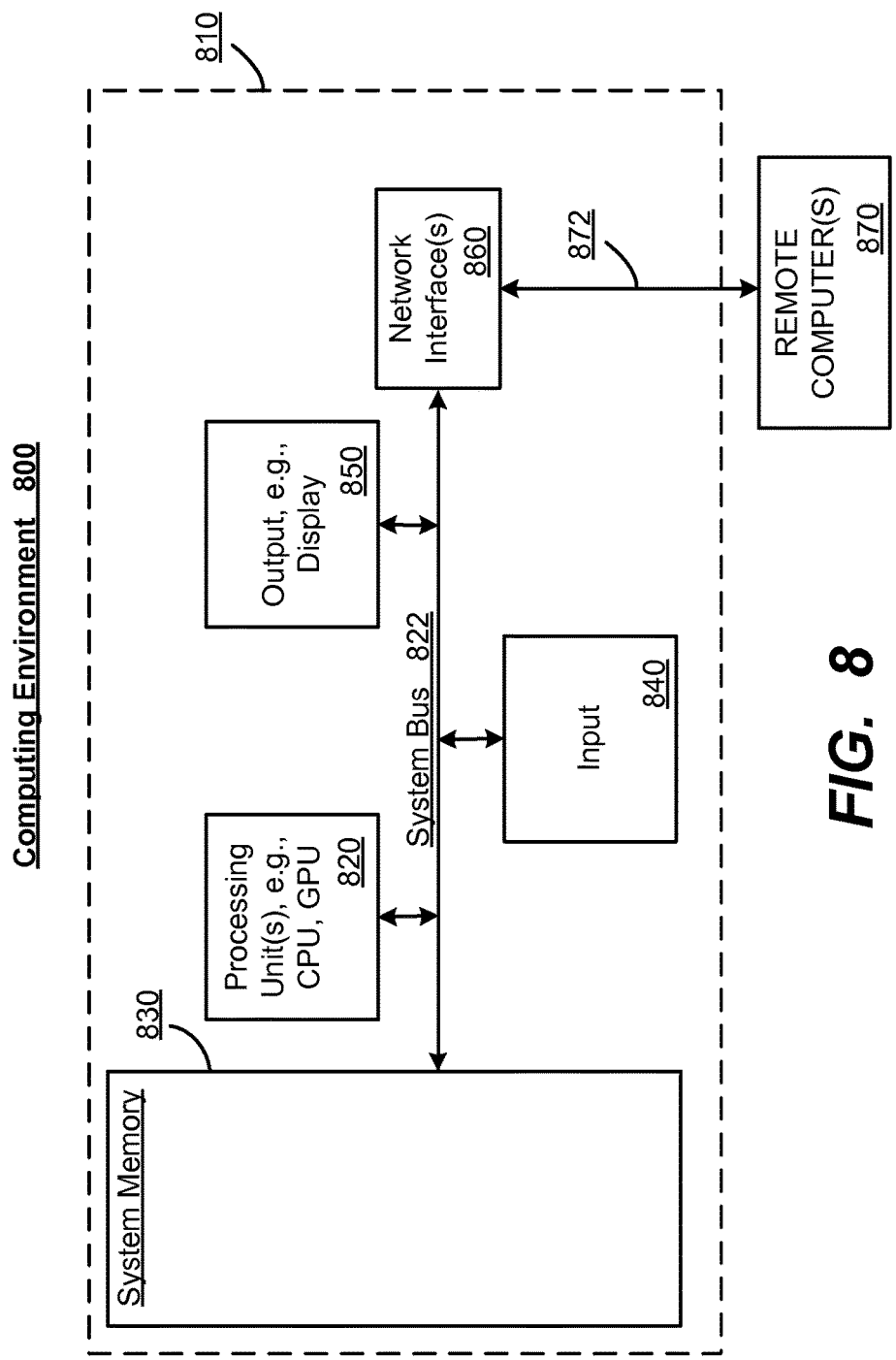
FIG. 8 is a block diagram representing an example non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. One or more computer-readable storage hardware devices having computer-executable instructions, which when executed perform operations comprising:
   accessing query related data between a set of advertisers and a set of queries, the query related data being retrieved from a query related data store;
   grouping queries into a cluster for each advertiser in which each cluster comprises a first set of queries that include queries previously bid on by the advertiser or a second set of queries that include queries the advertiser has previously spent money on to build a layer of a tree structure;
   generating a set of communities in which each community comprises at least one query cluster and corresponds to a subset of the set of advertisers;
   determining a modularity corresponding to the communities;
   increasing modularity amongst the community until the tree structure reaches a maximum modularity;
   using the tree structure to generate mini-market data describing each cluster on a densest layer of the tree structure as an individual mini-market, each minimarket representing a set of queries related to a set of advertisers based upon advertiser behavior;
   determining an optimal set of auction parameters for each cluster on the densest layer of the tree structure;
   establishing a search auction for the set of advertisers based on one or more of the mini-markets and the optimal set of auction parameters; and
   presenting content associated with an advertiser from the set of advertisers at a particular location on a search result page based on the search auction.

2. The one or more computer-readable storage hardware devices of claim 1, wherein the second set of queries have had more than a threshold number of clicks.

3. The one or more computer-readable storage hardware devices of claim 1, wherein the first set of queries and the second set of queries include one or more queries that have provided revenue above a defined threshold.

4. The one or more computer-readable storage hardware devices of claim 1 wherein merging the communities into another set of communities forms a new layer on a tree structure.

5. The one or more computer-readable storage hardware devices of claim 4 having further computer-executable instructions comprising:
   adding layers to the tree structure until the tree structure achieves stability; and
   establishing auction parameters based upon the tree structure.

6. The one or more computer-readable storage hardware devices of claim 5 having further computer-executable instructions comprising:
   updating the auction parameters when the tree structure changes.

7. The one or more computer-readable storage hardware device of claim 4, wherein a top layer of the tree structure is characterized by a division of nodes within which network connections are dense but between which network connections are more sparse.

8. A method performed at least in part on at least one processor, the method comprising:
   accessing query related data between a set of advertisers and a set of queries, the query related data being retrieved from a query related data store;
   grouping queries into a cluster for each advertiser in which each cluster comprises at least one of a set of queries that include queries previously bid on by the advertiser or a second set of queries that includes queries the advertiser has previously spent money on to build a layer of a tree structure;

generating a set of communities in which each community comprises at least one query cluster and corresponds to a subset of the set of advertisers;

determining a modularity corresponding to the communities;

increasing modularity amongst the community until the tree structure reaches a maximum modularity;

using the tree structure to generate mini-market data describing each cluster on a densest layer of the tree structure as an individual mini-market, each minimarket representing a set of queries related to a set of advertisers based upon advertiser behavior;

determining an optimal set of auction parameters for each cluster on the densest layer of the tree structure;

establishing a search auction for the set of advertisers based on one or more of the mini-markets and the optimal set of auction parameters; and presenting content associated with an advertiser from the set of advertisers at a particular location on a search result page based on the search auction.

9. The method of claim 8, wherein the second set of queries have had more than a threshold number of clicks.

10. The method of claim 9, wherein a top layer of the tree structure is characterized by a division of nodes within which network connections are dense but between which network connections are more sparse.

11. The method of claim 8, wherein the first set of queries and the second set of queries include one or more queries that have provided revenue above a defined threshold.

12. The method of claim 8, wherein merging the communities into another set of communities forms a new layer on a tree structure.

13. The method of claim 12, wherein the method further comprises:
adding layers to a tree structure until the tree structure achieves stability; and
establishing auction parameters based upon the tree structure.

14. The method of claim 13, further comprising updating the auction parameters when the tree structure changes.

15. A system comprising:
a memory for storing query related data for advertisers; and
a processor coupled to the memory, the processor programmed to:
access, from the memory, query related data between a set of advertisers and a set of queries, the query related data being retrieved from the memory;
group queries into a cluster for each advertiser in which each cluster comprises at least one of a set of queries that include queries previously bid on by the advertiser or a second set of queries that includes queries the advertiser has previously spent money on to build a layer of a tree structure;
generate a set of communities in which each community comprises at least one query cluster and corresponds to a subset of the set of advertisers;
determine a modularity corresponding to the communities;
increase modularity amongst the community until the tree structure reaches a maximum modularity;
use the tree structure to generate mini-market data describing each cluster on a densest layer of the tree structure as an individual mini-market, each mini-market representing a set of queries related to a set of advertisers based upon advertiser behavior;
determine an optimal set of auction parameters for each cluster on the densest layer of the tree structure;
establish a search auction for the set of advertisers based on one or more of the mini-markets and the optimal set of auction parameters; and
present content associated with an advertiser from the set of advertisers at a particular location on a search result page based on the search auction.

16. The system of claim 15, wherein the second set of queries have had more than a threshold number of clicks.

17. The system of claim 15, wherein merging the communities into another set of communities forms a new layer on a tree structure.

18. The system of claim 17, wherein the processor is further programmed to:
add layers to the tree structure until the tree structure achieves stability; and
establish auction parameters based upon the tree structure.

19. The system of claim 18, wherein the processor is further programmed to update the auction parameters when the tree structure changes.

* * * * *